United States Patent

[11] 3,580,375

[72] Inventor John F. Nunes, Jr.
2037 Loquot Ave., Patterson, Calif. 95363
[21] Appl. No. 803,825
[22] Filed Mar. 3, 1969
[45] Patented May 25, 1971

[54] SOD-HANDLING MACHINE
5 Claims, 10 Drawing Figs.
[52] U.S. Cl. .................................................. 198/8,
172/19, 198/162
[51] Int. Cl. ...................................................... A01b 45/04,
B65g 65/06
[50] Field of Search ......................................... 198/7—8, 7
(BL), 162; 172/19, 20

[56] References Cited
UNITED STATES PATENTS
3,448,879  6/1969  Lely ................................. 198/7X
1,289,169  12/1918  Henderson .................... 198/7(BLX)
FOREIGN PATENTS
530,703  9/1956  Canada ........................... 198/7(BL)

Primary Examiner—Edward A. Sroka
Attorney—Flehr, Hohbach, Test, Albritton and Herbert ABSTRACT: For picking up precut sod from the ground or other support surface, the lower one of a pair of cyclically driven carriers first nudges the transverse edge of the sod upwardly into engagement with a rearwardly moving reach of an upper cyclic carrier. The confronting reaches of the upper and lower carriers engage opposite surfaces of the slab of sod to feed the sod upwardly into the machine for handling.

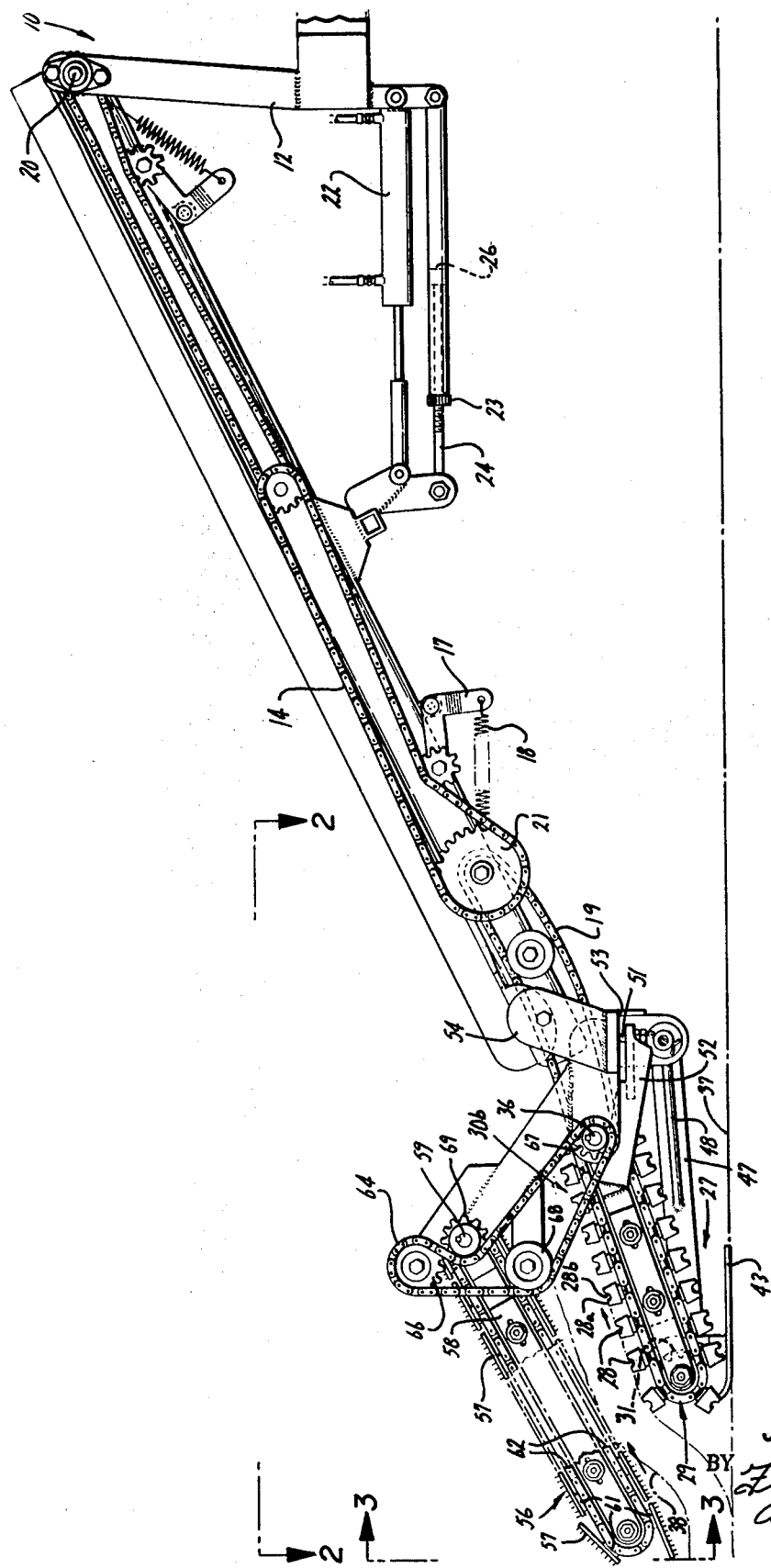

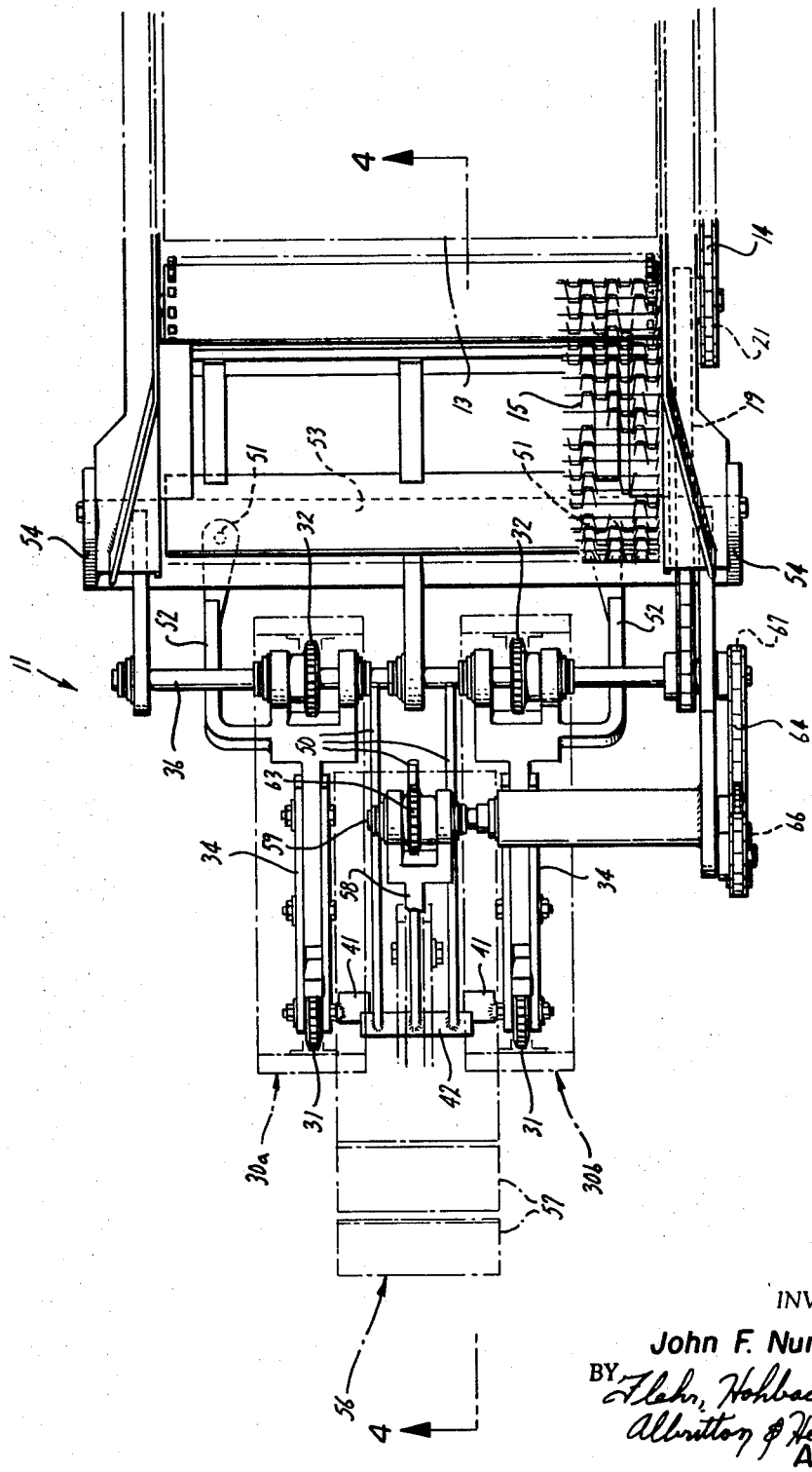

INVENTOR.
John F. Nunes, Jr.

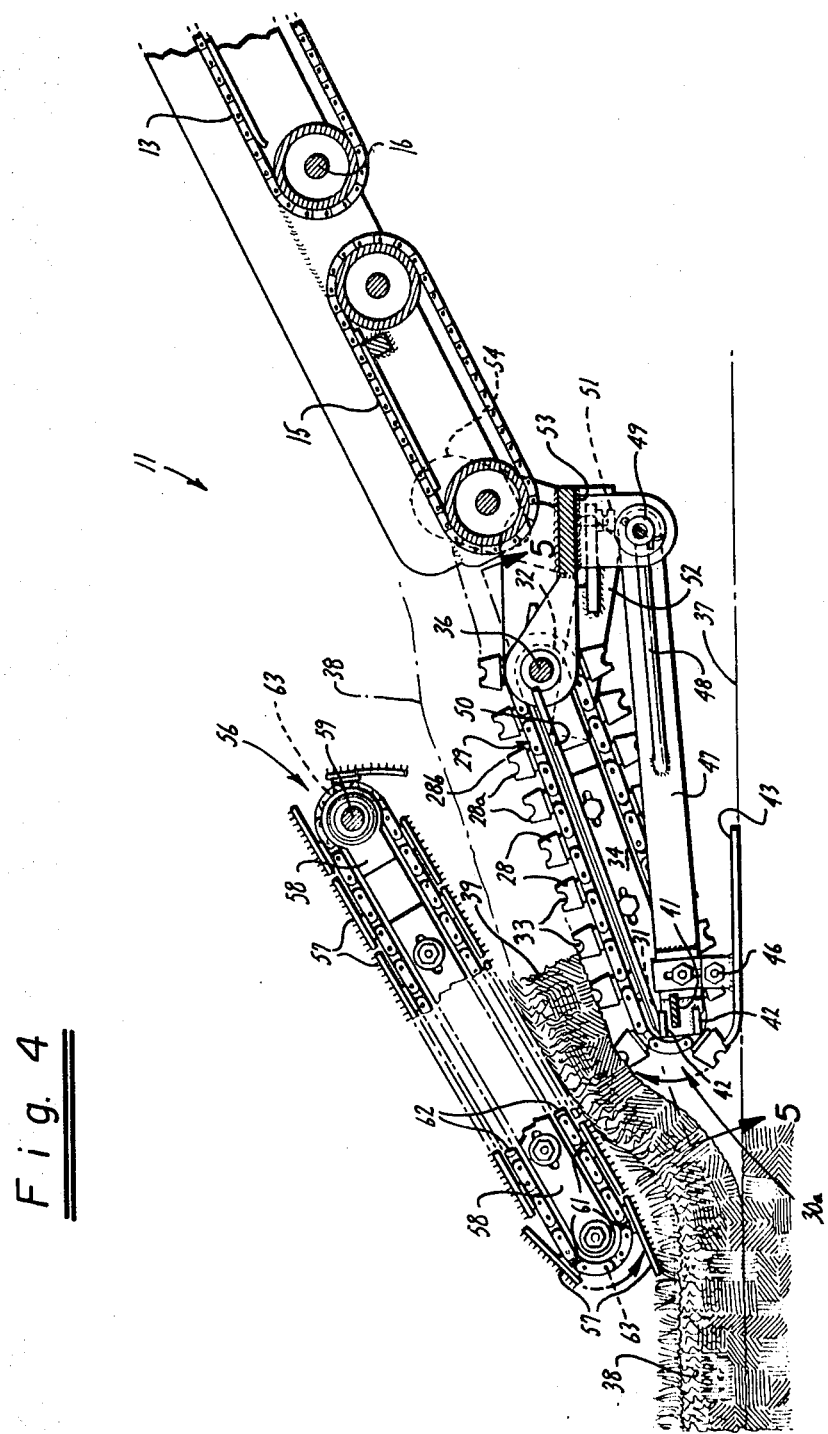

INVENTOR.
John F. Nunes, Jr.
BY Flehr, Hohbach, Test,
Albritton & Herbert
Attorneys

# 3,580,375

SOD-HANDLING MACHINE

BACKGROUND OF THE INVENTION

This invention relates to apparatus for lifting short lengths of sod from the ground or other support surface and for feeding the sod to suitable apparatus for handling. The apparatus is particularly useful in rolling sod into the traditional generally helical form, folding the sod or otherwise. One such sod rolling apparatus is shown in my copending application Ser. No. 437,511, filed Mar. 5, 1965.

In harvesting a field of sod, a suitable sod-cutting machine is typically first employed whereby the operator of the sod cutter can proceed independently with maximum precision to cut the sod into appropriate lengths, slabs or continuous ribbons to be harvested. Following the cutting operation, the sod can be manually collected onto pallets or mechanically harvested, as by means such as shown in the above-identified patent application.

Where mechanical harvesting is involved, one of the most troublesome problems has been the initial gripping and lifting of the sod onto a conveyor where it can be subsequently properly handled. As disclosed herein, an improved means for engaging and picking up the sod strips, slabs, ribbons, etc. has been provided in a manner as generally summarized below.

SUMMARY OF THE INVENTION AND OBJECTS

An assembly for picking up sod from a support surface as, for example, the underlying bare earth from which the sod has been severed, comprises an upper and lower cyclically driven carrier arranged in spaced relation to provide confronting reaches of two carriers moving in a common direction to carry the sod therebetween. The leading end portion of the lower carrier is disposed at a level adapted to intercept an edge of the sod to be picked up. Upon engagement with the sod edge, the lower carrier initiates upward movement of the edge in the manner, for example, of nudging the sod upwardly. A portion of the upper carrier is positioned to overhang the leading end portion of the lower carrier so as to provide a moving surface directly in the path of the upwardly moving edge of sod. The moving surface of the upper carrier is spaced sufficiently closely to the region of initial upward movement of the sod edge so as to engage and direct the rising sod into the spacing defined between the confronting reaches of the two carriers.

It is a general object of the present invention to provide an improved "front end" assembly for sod-harvesting apparatus.

It is another object of the invention to provide an improved sod pickup assembly capable of operating in difficult soil conditions as where rocks, boulders, and the like may be encountered beneath the severed sod, or in uneven ground.

The foregoing and other objects of the invention will become more readily apparent from the following detailed description of preferred embodiments when considered in conjunction with the accompanying drawings.

BRIEF DESCRIPTION OF THE DRAWING

FIG. 1 is a side elevation view, according to the invention;

FIG. 2 is a plan view of FIG. 1 taken along the line 2—2 thereof;

FIG. 4 is a side elevation section view taken along the line 4—4 of FIG. 2;

DESCRIPTION OF THE PREFERRED EMBODIMENT

Figure 5:
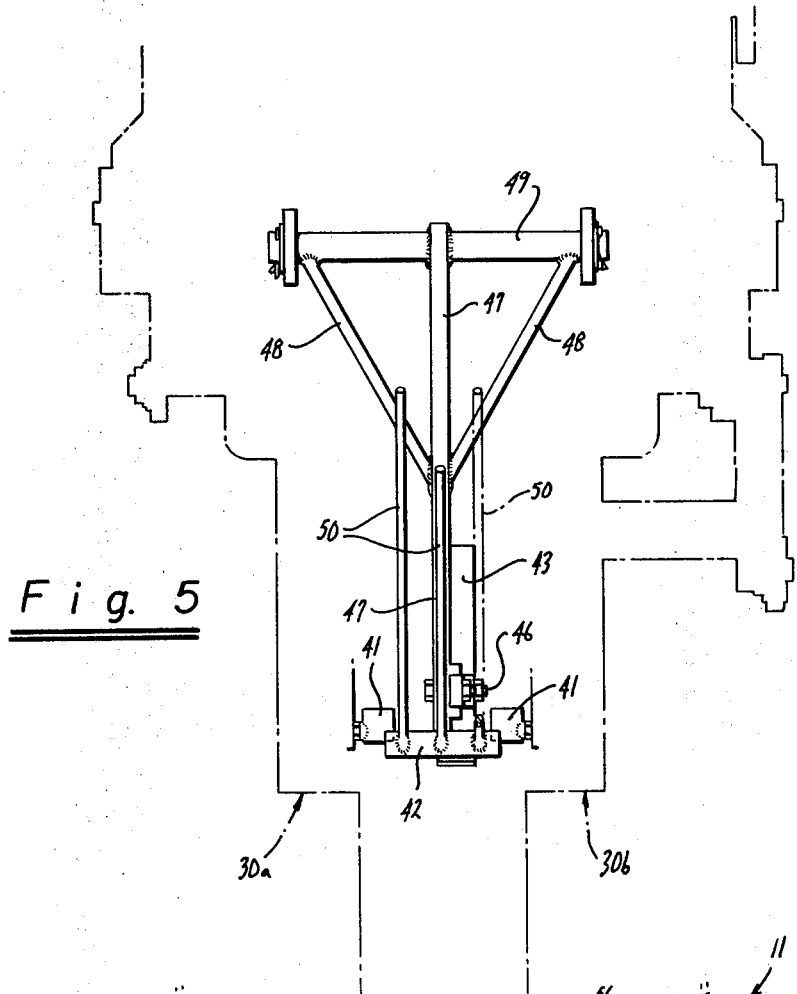
FIG. 5 is a plan detail view, in section, taken along the line 5—5 of FIG. 4.
Figure 3:
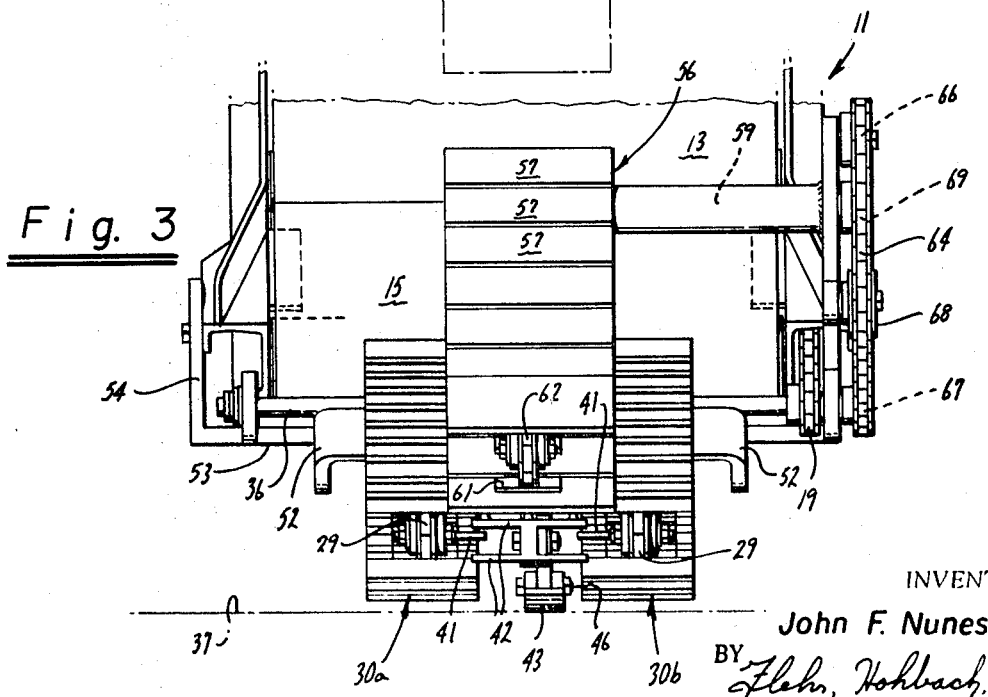
FIG. 3 is an elevation view taken along the line 3—3 of FIG. 1.

In sod-harvesting apparatus of the type referred to in the above-identified application, means generally are provided for engaging and wedging the leading edge of a length of sod upwardly onto an inclined conveyor. The sod is then carried to a sod-rolling station and such a sod-harvesting apparatus or other sod-handling equipment has been schematically indicated in the drawing by the reference numeral 10 whereby the sod will be handled as desired.

As disclosed herein, a particularly improved means for picking up the sod and carrying it through a machine of the above type has been disclosed in the drawing and is referred to generally as the pickup and transport assembly 11. Assembly 11 is, of course, carried by the frame 12 of sod-handling apparatus 10 and includes an upwardly moving conveyor 13. Means, such as the chain belt 14, driven by a power source (not shown), such as a hydraulic motor, serve to rotate the driving axle 16 of conveyor 13. A bellcrank 17, held by spring 18, maintains belt 14 substantially taut at all times.

A second chain belt 19 is driven from a sprocket located on the shaft 16 to drive conveyor 15.

By inspection, it is to be observed that the diameter of the drive gear 21 substantially exceeds the diameter of a drive gear carried on shaft 16 for driving conveyor 15 whereby the upper conveyor 14 is moved at a rate substantially in excess of the linear rate of movement of that of conveyor 15 upstream of conveyor 14. By providing such speed differentials in the conveyor system, the downstream sod pieces separate away from those immediately following pieces to provide an identifiable gap between each sod piece in the flow of sod.

Means for selectively lifting and lowering conveyors 13, 15 in a manner serving to raise and lower the pickup assembly 11 (for purposes more fully explained below appertaining to feeding of continuous sod ribbons) includes the hydraulic ram 22 operated by suitable conventional control levers to move between advanced and retracted positions limited, in its lower movement, by the provision of a predetermined stop 23 carried on a guide shaft 24 adapted to enter, and be guided by, the pivotally supported piston 26. Upward movement of assembly 11 is limited by the throw of the piston within hydraulic ram 22. Thus, frame 12 can be raised or lowered selectively as desired between predetermined limits.

Pickup assembly 11 further includes the cyclically trained carrier assembly 27 which serves to make initial contact with the leading edge of the sod and nudge the sod edge upwardly in a manner whereby the sod then may be gripped over a substantial portion thereof for proper handling. Carrier assembly 27 comprises a pair of cyclically trained belt assemblies 30a, 30b characterized by a series of individually articulated spaced cleats 28 carried on chain link belts 29, 30 trained about sprockets 31, 32.

Each cleat 28 includes a pair of outwardly facing sod-engaging edges 28a, 28b which flank an annular groove 33 therebetween.

The shape of groove 33 tends to readily discharge soil, pebbles and the like which otherwise could impair the functioning of edges 28a, 28b if permitted to become caked within the gap between edges 28a, 28b. The dual edges 28a, 28b are of a stiff but resilient deformable material, such as one of the tougher plastics now widely in use. This resilience permits the edges 28 to "work" and thereby further aid in keeping groove 33 free of caked material.

Extensible belt support arms 34 space the sprockets 31, 32 for tensioning and supporting belts 29, 30 to pivot about the transverse support rod 36.

Hence, each of two series of cleats is carried for cyclic movement by belt assemblies 30a, 30b. Each assembly 30a, 30b is mounted at its rear end for pivotal movement about the axis defined by rod 36.

Thus, the lower carrier 27 includes both a first and second series of sod-engaging elements, such as cleats 28, travelling in laterally spaced cyclic paths, supported by means which carries each of the two series of cleats to rise and fall freely in terrain following movement independently of each other to a limited extent as explained more fully below.

Means are provided which serve to limit the excursions of the leading end portion of each of the two assemblies 30a, 30b. In addition, means are provided serving to space the lowermost travel of cleats 28 slightly above the level 37 of the bared ground or other support surface which is being exposed by sod 38 as it is being picked up from surface 37. In this manner, a leading end portion of the lower carrier 27 travels at a level adapted to intercept the edge 39 of sod 38 which is to be picked up and, upon engagement therewith, serves to initiate upward movement of the sod edge 39.

Accordingly, an adjustable skid 43 rides along the newly exposed surface 37 of the earth and follows the terrain by a pivotal mounting at point 46. Skid 43 is carried from the leading end of a forwardly extending support arm 47, braced against the impact of lateral forces by means of angularly disposed braces 48 welded at their leading ends to the support arm 47 and mounted at their trailing ends for pivoting movement about a transversely extending axle 49. The trailing end of support arm 47 is similarly pivotally mounted on the transverse axle 49 whereby skid 43 also causes it to rise and fall freely with terrain-following movement. Thus, by adjustment of the height of arm 47 above skid 43, there may be established a very close predetermined clearance between the path travelled by the outer extremities of cleats 28 and the ground surface 37.

Independent movement of assemblies 30a, 30b is limited by means, as now to be described, all of which rides upon skid 43 in supporting relation with respect to each of the two independently mounted assemblies 30a, 30b.

At the leading end of arm 47, there is mounted a pair of limit flanges or plates 42 between which tabs 41, carried by the forward ends of support arms 34, are free to rise and fall independently of each other. Thus, one of the cyclic cleat belt assemblies 30a, 30b may encounter a rock or other obstruction and rise somewhat without elevating the other belt. On the other hand, if the obstruction is substantial, both belts of cleats will be raised, due to the fact that as soon as the lower limit plate 42 of one assembly 30a, 30b engages its associated tab 41 and continues to rise, the other assembly 30b, 30a of the lower carrier 27 will be raised when engagement occurs between the lower limit plate 42 and its associated tab 41. Arm 47 is, of course, free to rise and fall due to its pivoted mounting.

However, means for limiting the downward travel of the cyclic path defined by cleats 28 includes the adjustable stop bolts 51 carried in the outer ends of a pair of rocker arms 52. Rocker arms 52 are supported for a rocking movement about axle 36. The other ends of rocker arms 52 serve to carry the belt support arms 34. Bolts 51 are disposed to bear upwardly against the underside 53 of fixed plates 54 bolted to the end of the machine frame.

Bolts 51, therefore, serve to permit the entire front end assembly 27 to be lifted above the surface of the ground by elevating the lower end of frame 12, as by means of hydraulic ram 22. Thus, both assemblies 30a and 30b may be lifted selectively simultaneously and positively by ram 22 to operate at a level well clear of the ground 37 or other support surface.

An upper carrier assembly 56 serves to provide a cyclic series of semirigid backup pads 57 providing surface portions arranged to travel in a generally planar path above the lower carrier 27 and in confronting spaced relation thereto. The upper carrier assembly 56 extends along and overlies a major portion of the lower carrier 27 to permit the surface portions of pads 57 to engage sod 38 between carrier 27 and 56 over a broad region of the sod.

Upper carrier assembly 56 is arranged whereby pads 57 travel in a cyclic path which includes a portion that overhangs the leading end portion of the lower carrier 27 in a position to intercept upward movement of sod being urged upwardly by cleats 28. Therefore, pads 57 serve to form a backstop preventing further upward movement of sod edge 39 at that point in time when it is being initially moved upwardly. At the same time, the rearward movement of pads 57 moves the sod edge 39 rearwardly through the space defined between the upper and lower carriers.

Carrier 56 is supported by a pair of extensible support arms 58 pivotally mounted at their rear ends about the transversely extending support rod 59.

Pads 57 are carried at their leading ends by a suitable mounting element 61 fixed to a link in the support chain 62 whereby each of pads 57 is articulated independently of the others and at its leading edge. Thus, it will be readily apparent that the trailing edge of pads 57 quickly makes a broad sweep forwardly in front of the machine as it progresses across a field, for example, and therefore further projects the backup surface portions of the cyclic path beyond the front of lower carrier 27. In this manner, the upper carrier "reaches out" to recapture any sod edges tending to move beyond its grip.

Chains 62 travel about sprockets (not shown) driven by rotation of shaft 59. Means for driving shaft 59 includes the cyclic drive chain 64 trained about sprockets 66, 67, a tensioning pulley 68 and a driven sprocket 69 mounted by a key to rotate shaft 59.

Means for driving chain 64 via drive sprocket 67 includes the chains 14 and 19 described above.

Means disposed between the two carrier assemblies 30a, 30b for providing support to the upwardly carried sod 38 includes the three upwardly inclined and rearwardly tending rigid rods 50 welded to the top surface of the transversely extending upper limit plate 42. Thus, as sod moves upwardly along its inclined path, the pebbles and rocks which may be attached to the undersurface of the sod are free to drop downwardly through the machine.

Figure 6A:
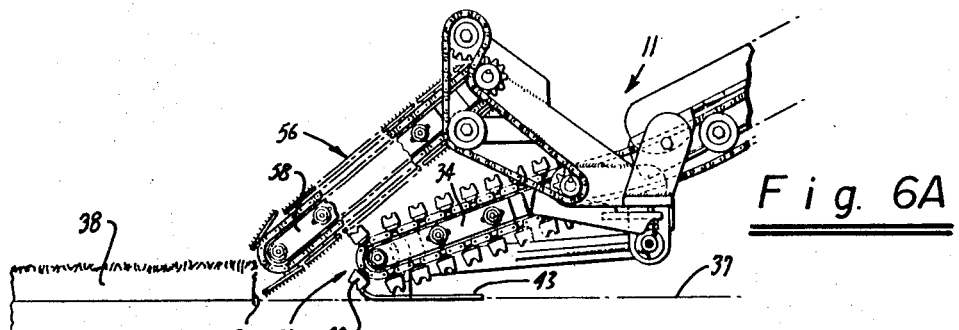
FIGS. 6A—6E are side elevation views sequentially arranged to show the picking up of an edge of sod according to the invention.
Figure 6B:
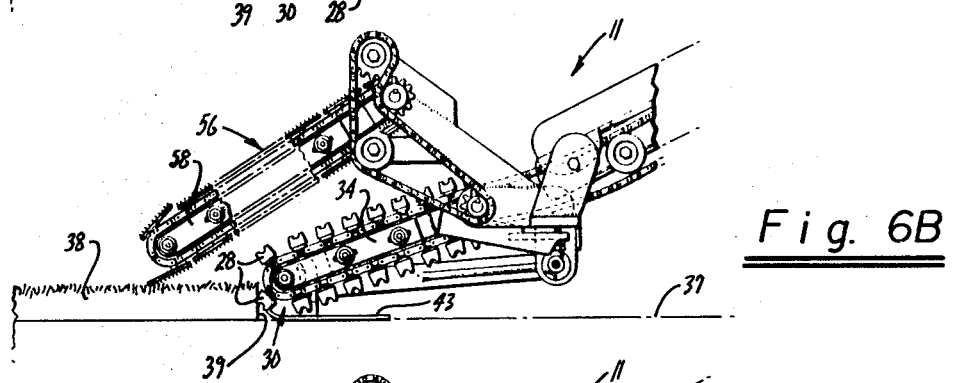
Figure 6C:
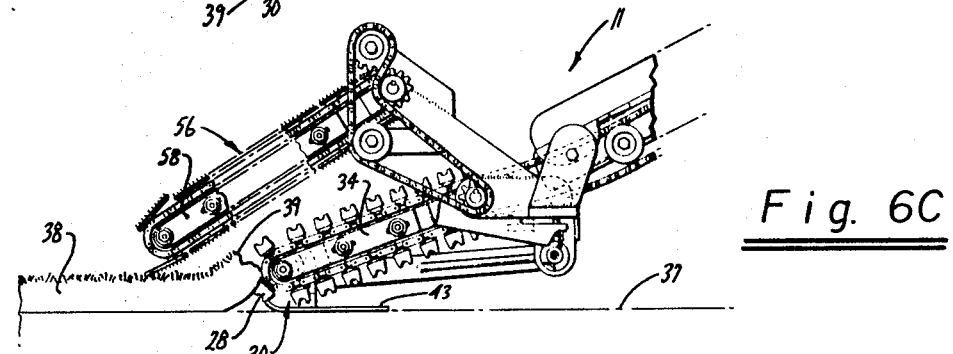
Figure 6D:
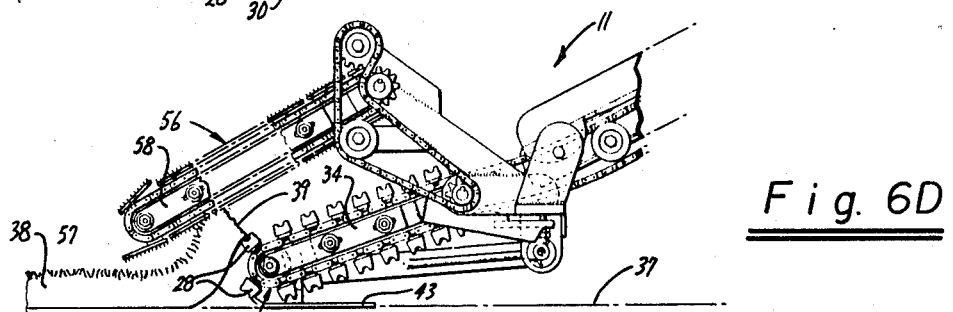
Figure 6E:
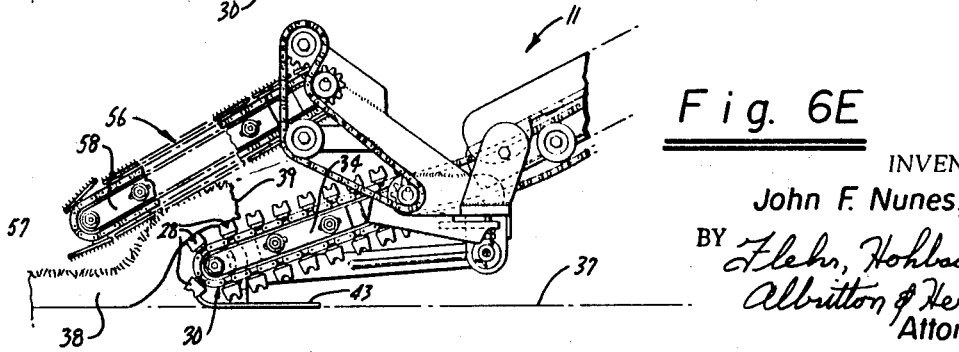

Operation of the apparatus described above when picking up lengths of precut sod from a field of sod or other support surface 37 may be briefly reviewed as follows with reference to FIGS. 6A—6E.

From a suitable power takeoff, the chains 14, 19 serve to drive both the lower and upper cyclic carrier assemblies. The confronting reaches of the two assemblies 27, 56 move in a common direction rearwardly. The two confronting reaches also move at substantially the same speed.

The front end of the lower carrier assembly 27 usually is disposed by the fixed stop 23 at a level whereby carrier 27 intercepts the edge 39 of sod 38. The upwardly moving sod-engaging edges 28a, 28b of cleats 28 nudge the sod upwardly in an action tending to cause the sod to commence to roll backwardly on itself. This upward movement of the sod edge 39, however, is immediately interrupted by the rearwardly moving sod-engaging surface portions of backup pads 57 then disposed transversely to the upwardly moving sod edge. Subsequently, the rearwardly moving pads 57 diverge out of engagement with the upper surface of sod 38 lying on the upper reach of carrier 27 whereby the trailing ends of pads 57 are permitted to swing out of the way of the upper surface of the sod.

Sod picked up in the manner above described is, of course, positively drawn upwardly along its inclined path so that it ultimately reaches conveyor 15 formed of a chain mesh material to permit pebbles and other small particles to fall downwardly to the ground. Conveyor 15 runs somewhat slightly faster than the linear speed of carrier 27 delivering sod to conveyor 15, but is operating at a linear speed slightly less than the linear speed of the next subsequent conveyor 13 to which the sod will be delivered.

In the event that the leading portion of carrier 27 encounters an obstacle in the way of one or the other of the two assemblies 30a or 30b, that particular assembly will rise to a limited extent due to the fact that it is independently pivotable with respect to the other assembly. For example, assuming that assembly 30a is initially contacted by a large obstruction, such as a large rock or other obstruction, lying in its path (but not lying in the path of assembly 30b), assembly 30a will commence to rise until its tab 41 contacts the upper limit plate 42 with which it is associated. At that point, arm 47 will rise somewhat until the lower limit plate 42 associated with the other tab 41 (carried by assembly 30b) is ultimately contacted. Further movement of assembly 30a will serve to carry both the weight of arm 47 and the restraining weight of assembly 30b upwardly to permit assembly 30a to clear the large obstruction over which it is passing.

On the other hand, if the obstruction is relatively small, disturbance of carrier 30b will not be necessary, notwithstanding the fact that assembly 30a is rising and falling over smaller obstructions in its path.

In some applications, for example, as where long, continuous ribbons of precut sod are to be picked up, the initial pickup is made as described above and thereafter ram 22 is operated to elevate the leading end of carrier 27 to operate at a level well clear of the ground. Ram 22, therefore, raises the entire pickup assembly 11 from its pivotal mounting point 20.

Also, while merely driving the sod-harvesting equipment to and from its work location it may be desirable to elevate the front end of the equipment using ram 22.

Finally, even though a tractor, for example, carrying the sod-handling machine at its side, may be riding on level ground, the "front end" pickup assembly 11 can ride on uneven sloping ground and continue to function efficiently by virtue of the independently supported assemblies 30a, 30b.

I claim:

1. In a sod-handling machine having a frame, an assembly carried by the frame for picking up sod to be handled while said frame travels in a direction relative to the sod, cyclically moving carrier means disposed to include a lower reach moving forwardly in the direction of travel and an upper reach moving rearwardly in an opposite direction for advancing the sod through the machine, means supporting a leading portion of said lower reach in closely spaced relation above the supporting surface being exposed by removal of the sod therefrom, the forwardly moving portions of the carrier means being disposed for engaging that sod to be picked up and serving to initiate upward lifting of the leading edge of said sod, said lower reach moving in the direction of travel of the machine and including a series of cleats formed with pairs of outwardly facing sod-engaging ribs flanking an annular groove therebetween, and means supporting said cleats to move in a cyclic path to engage an edge of the sod, and cyclically trained holddown means disposed above the region of said initial lifting to form rearwardly moving backup surface portions against which said carrier means directs said sod at the time of initiating said upward lifting of the sod, said holddown portions cooperating with said upper reach to positively withdraw the sod and advance same for handling.

2. In a sod-harvesting machine of a type adapted to travel across a field of severed sod and having a frame, an assembly carried by the frame for picking up the sod from the field comprising upper and lower cyclically driven carriers, said carriers being disposed with spaced, confronting portions thereof moving in a common direction and spaced sufficiently closely to cause said portions to engage the opposite surfaces of sod to transport sod therebetween, means supporting a leading end portion of the lower carrier to move independently of said frame to ride with terrain-following movement at a level adapted to intercept an edge of sod to be picked up and upon engagement therewith to initiate upward movement of the sod edge, the last said means further supporting said upper carrier disposed above said leading end portion in the path of said upwardly moved edge and spaced sufficiently closely thereto to engage and draw the rising sod edge between said confronting portions.

3. In a sod-harvesting machine of a type adapted to travel across a field of severed sod and having a frame, an assembly carried by the frame for picking up the sod from the field comprising upper and lower cyclically driven carriers, said carriers being disposed with spaced, confronting portions thereof moving in a common direction to transport sod therebetween, a leading end portion of the lower carrier being disposed at a level adapted to intercept an edge of sod to be picked up and upon engagement therewith to initiate upward movement of the sod edge, said lower carrier including a first and second series of sod-engaging portions travelling in laterally disposed cyclic paths, means supporting each of said first and second series to rise and fall freely in terrain-following movements within predetermined limits and independently of each other, said upper carrier being disposed above said leading end portion in the path of said upwardly moved edge and spaced sufficiently closely thereto to engage and direct the rising sod between said confronting portions.

4. In a sod-harvesting machine of a type adapted to travel across a field of severed sod and having a frame, an assembly carried by the frame for picking up the sod from the field comprising upper and lower cyclically driven carriers, said carriers being disposed with spaced, confronting portions thereof moving in a common direction to transport sod therebetween, a leading end portion of the lower carrier being disposed at a level adapted to intercept an edge of sod to be picked up and upon engagement therewith to initiate upward movement of the sod edge, said lower carrier including independently articulated cleats formed to include spaced parallel blade portions extending transversely of the cyclic path of the lower carrier, said upper carrier being disposed above said leading end portion in the path of said upwardly moved edge and spaced sufficiently closely thereto to engage and direct the rising sod between said confronting portions.

5. In a sod-harvesting machine of a type adapted to travel across a field of severed sod and having a frame, an assembly carried by the frame for picking up the sod from the field comprising upper and lower cyclically driven carriers, said carriers being disposed with spaced, confronting portions thereof moving in a common direction to transport sod therebetween, a leading end portion of the lower carrier being disposed at a level adapted to intercept an edge of sod to be picked up and upon engagement therewith to initiate upward movement of the sod edge, said upper carrier being disposed above said leading end portion in the path of said upwardly moved edge and spaced sufficiently closely thereto to engage and direct the rising sod between said confronting portions, said upper carrier including independently articulated backup surface portions arranged to travel in a generally planar path above said lower carrier in confronting spaced relation thereto.